UNITED STATES PATENT OFFICE.

EDWARD BALBACH, OF NEWARK, NEW JERSEY.

IMPROVED PROCESS OF SEPARATING SILVER AND GOLD FROM LEAD.

Specification forming part of Letters Patent No. 43,385, dated July 5, 1864.

*To all whom it may concern:*

Be it known that I, EDWARD BALBACH, of Newark, in the county of Essex and State of New Jersey, have invented a new and Improved Process of Separating Silver and Gold from Lead; and I do hereby declare that the following is a full and exact description thereof.

The nature of my invention consists in a cheap and expeditious method of separating silver and gold from lead, when zinc is used in the process of separation, by means of casting the lead which contains the silver and gold in combination with zinc into pigs, as soon as the zinc has been sufficiently stirred with the lead to take up its silver and gold, and then remelting the lead in a furnace with an inclined hearth under a degree of heat sufficient to melt the lead, but not sufficient to melt the zinc, silver, and gold, when the lead runs off, leaving the zinc, silver, and gold unmelted in the furnace.

To enable others skilled in the art to make use of my invention, I will proceed to describe the precise process.

I first mix the melted lead with a sufficient amount of melted zinc to take up all the silver and gold the lead contains in a kettle, which may be done by melting the lead in the kettle and then adding to it the melted zinc; but I prefer to put the zinc in the kettle and melt it and then add to it the lead in a fused state, which I accomplish by putting the refined lead, which contains the silver and gold, in a low-heated furnace with an inclined hearth, where the lead is melted and run into the kettle containing the melted zinc, the lead leaving some of its impurities in the furnace, thus further-refining it. The mixture is next stirred in the kettle about fifteen minutes, or until the zinc has taken up all the silver and gold which the lead contains, when the mixture is cast into pigs. I usually put from twenty to eighty pounds of zinc in the kettle to melt, when I place one ton of lead in the furnace to be melted and mixed with it, the percentage of zinc to be used depending upon the richness of the lead in silver and gold. After the mixture of lead, silver, gold, and zinc has been cast into pigs these pigs are placed in a furnace with an inclined hearth and heated sufficiently to melt the lead, but not enough to melt the zinc, silver, and gold, which will therefore remain in the furnace, the pure lead running out and being cast in pigs suited to the market.

This process separates the lead from the zinc, silver, and gold better and vastly quicker than by the process used heretofore, which is to continue the stirring in the kettle two or three hours, and then allowing the fire to cool down, and dipping off the zinc in combination with the silver and gold as it rises to the top, the lead being drawn off afterward. I do not claim melting lead combined with silver and gold in a furnace; but

What I claim, and desire to secure by Letters Patent, in the process of separating gold and silver from lead, is—

1. Melting the lead which contains the silver and gold in a furnace with an inclined hearth, and drawing it off into a kettle containing or to contain a proper quantity of zinc to take up its silver and gold, instead of melting it in the kettle, as and for the purposes herein described and set forth.

2. Casting the mixture of lead, silver, zinc, and gold after it has been sufficiently stirred for the zinc to take up the silver and gold into pigs or masses of suitable form and size to remelt in the furnace.

3. Placing these pigs or blocks of lead, zinc, silver, and gold in a furnace with an inclined hearth and then subjecting them to a low degree of heat sufficient to cause the lead to melt and run off, but not sufficient to melt the zinc, silver, and gold.

EDWARD BALBACH. [L. S.]

Witnesses:
E. B. BOONE,
EDW. BROGAN.